Figure 1:
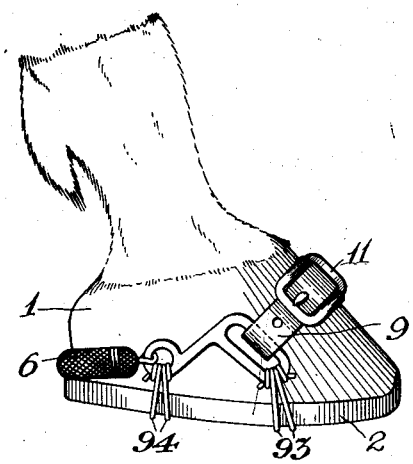

G. N. KINNELL.
OVERSHOE.
APPLICATION FILED JAN. 3, 1910.

1,010,384.

Patented Nov. 28, 1911.

WITNESSES:
Chas. F. Clagett
[signature]

INVENTOR
George N. Kinnell
BY
George C. Clean ATTORNEY

UNITED STATES PATENT OFFICE.

GEORGE N. KINNELL, OF PITTSFIELD, MASSACHUSETTS.

OVERSHOE.

1,010,384.      Specification of Letters Patent.      Patented Nov. 28, 1911.

Original application filed March 6, 1909, Serial No. 481,830. Divided and this application filed January 3, 1910. Serial No. 536,058.

*To all whom it may concern:*

Be it known that I, GEORGE N. KINNELL, a citizen of the United States, and a resident of Pittsfield, in the county of Berkshire and State of Massachusetts, have invented certain new and useful Improvements in Overshoes, of which the following is a specification.

My present invention concerns detachable overshoes for various purposes, particularly applicable for use on horses and other hoofed animals for various purposes and particularly to prevent slipping.

My present application is a division of my application Serial No. 481,830 filed March 6, 1909.

In my prior application Serial No. 460,336, I have shown an overshoe consisting of interconnected diagonal strands or articulations adapted to serve as calks and suspended by a spreader and equalizing lever on each side of the foot, subject to upward and forward tension through a toe strap and to rearward tension through a heel member seated in the notches under the heels of the hoof and above the rearwardly projecting ends of the metallic shoe. The heel member may be of fine quality steel wire or chain, but I prefer heavy baling wire which does not stretch and is not very resilient, yet is flexible enough so that in use it fits itself to the surface upon which it bears and becomes bent or set so that there is practically no tendency for it to spring out of position. Various other novel features and functions of said overshoe are explained in said application. In other applications, I have described auxiliary means for supporting the heel member independently of engagement with the heels of the hoof. For present purposes, I have chosen to show the heel member as consisting of cushioned wire engaging the notches between the ordinary shoe and the heels of the hoof, after the manner set forth in said application Serial No. 460,336; also, the tread members are shown as consisting of strands formed of wire. These may be disposed across the cavity under the hoof in any desired way, though for most purposes I prefer the diagonal arrangement with an interconnecting central link, such as shown in the aforesaid application.

In all of the figures, the securing means on the overshoe includes a tension member extending diagonally over the toe of the hoof and adapted to oppose downward and rearward displacement, after the manner explained in said application.

The various features constituting my present invention will be evident from the following detailed description in connection with the accompanying drawings, in which—

Figure 3:
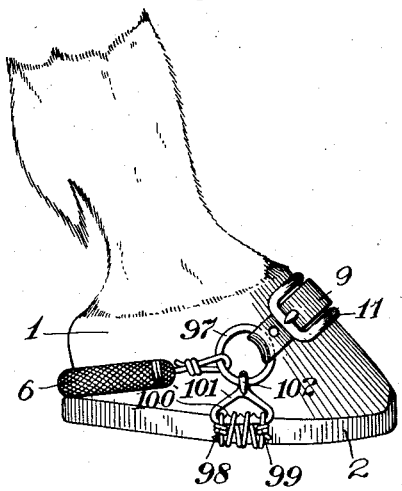
Figure 2:
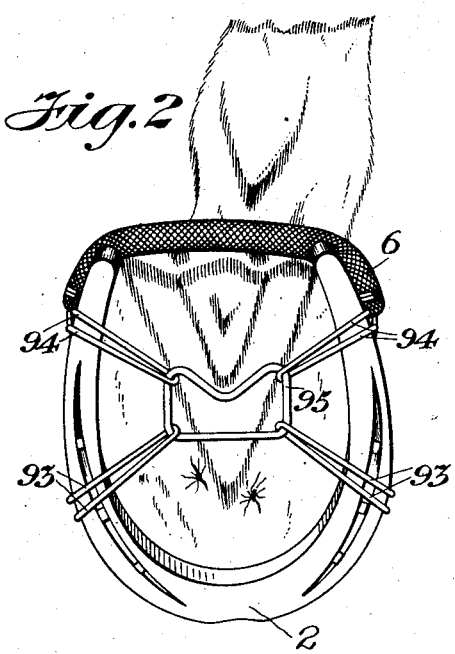
Figure 4:
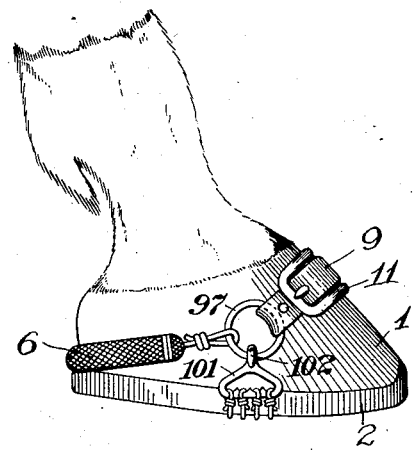

Figures 1, 3, and 4 are side elevations each showing a horse's hoof with an overshoe embodying various features of my invention. Fig. 2 is a bottom view of a horse's hoof with an overshoe as shown in Fig. 1.

In all of the figures, the hoof 1 is provided with the metal shoe 2 of the ordinary type projecting slightly beyond the heels of the hoof. In all of the figures, the securing means comprises a band encircling the walls of the hoof, comprising a heel member 6 and a toe member or strap 9, adapted to be tightened in place by buckle 11. The tread strands are connected to the securing means by means of a hook, as shown in Figs. 3 and 4, or by bending the ends of the strands as shown in Fig. 1.

Figs. 1, 2, 3, and 4 show flexible yielding tread strands adapted to serve as calks, but which are not articulated after the manner of the chain links shown in my application, 481830.

In Fig. 1, the securing means may be and preferably is in all respects similar to that shown in my prior application Serial No. 460,336. The tread strands, however, consist of fine quality steel wire, such as large size piano wire. In the said figure, the strands may be composed of one or more lengths of the wire, as indicated at 93, 93, 94, 94. The wires are not likely to injure the frog, and hence may be extended either directly or diagonally across the frog, though I prefer to provide a central spacing link 95, as shown in Fig. 2. In said figure, the rear side of the link is bent forwardly so as to cross the central region of the frog nearer the point thereof.

Figs. 3 and 4 show a securing means consisting of a link 97. The tread is composed of a plurality of wires extending diametrically across the tread. In Fig. 3, the wire is shown as one continuous length secured at one end 98 to the stirrup 101, and threaded back and forth across the tread around a similar stirrup on the other side of the hoof and secured at the other end 99 to said first mentioned stirrup. Fig. 4 differs from Fig. 3 in that each wire is separately secured. In both figures, the wires are disposed in recesses 100, adapted to maintain separation thereof. They are suspended from the link 97 by means of the stirrup 101, preferably by means of a hook 102. The latter is preferably of malleable metal to facilitate renewal of the tread portion when the wire of the same becomes broken. The old tread may be removed by breaking or bending open the hook 102, and the new tread may be applied by hooking the stirrup to the link and closing the hook by a blow of the hammer. It will be obvious that these terminal hooks for renewing treads of non-slip overshoes may be applied to any form of tread.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. In a device of the class described, tread connections and securing means comprising a diagonally arranged toe member, and a rearwardly extending heel member, a tread member formed of wire extending inward from the edge of the hoof a substantial distance beyond the bearing edge of the wall of the hoof, and an intermediate member for connecting said toe, heel, and tread members, fore or aft stresses on said tread being applied to said toe and heel members.

2. In a device of the class described, a tread comprising strands of wire extending down the wall of the hoof around its edge and inward a substantial distance beyond the bearing edge of the wall of the hoof, and suitable securing means for said tread.

3. As an article of manufacture, a flexible tread for overshoes comprising tread strands provided with open malleable metal terminals adapted to be secured in place by bending, said parts being proportioned and arranged to extend across the tread and to fit corresponding engaging portions of suitable securing means extending about the sides of the foot.

4. As an article of manufacture, a flexible tread for overshoes comprising tread strands of wire provided with open malleable metal terminals adapted to be secured in place by bending, said parts being proportioned and arranged to extend across the tread and to fit corresponding engaging portions of suitable securing means extending about the sides of the foot.

Signed at New York in the county of New York and State of New York this twenty third day of December A. D. 1909.

GEORGE N. KINNELL.

Witnesses:
GEORGE C. DEAN,
IRVING M. OBRIEGHT.

---

Copies of this patent may be obtained for five cents each, by addressing the "Commissioner of Patents, Washington, D. C."